(12) United States Patent
Ma

(10) Patent No.: US 9,514,320 B2
(45) Date of Patent: Dec. 6, 2016

(54) METHOD FOR MANAGING EXTERNAL PORTABLE STORAGE DEVICE AND RELATED MACHINE READABLE MEDIUM

(71) Applicant: MEDIATEK INC., Hsin-Chu (TW)

(72) Inventor: Tak-Man Ma, NT (HK)

(73) Assignee: MEDIATEK INC., Hsin-Chu (TW)

( * ) Notice: Subject to any disclaimer, the term of this patent is extended or adjusted under 35 U.S.C. 154(b) by 23 days.

(21) Appl. No.: 14/181,717

(22) Filed: Feb. 16, 2014

(65) Prior Publication Data

US 2014/0310824 A1    Oct. 16, 2014

Related U.S. Application Data

(60) Provisional application No. 61/811,120, filed on Apr. 12, 2013.

(51) Int. Cl.
*G06F 21/60* (2013.01)
*G06F 21/62* (2013.01)

(52) U.S. Cl.
CPC ... *G06F 21/6209* (2013.01); *G06F 2221/2143* (2013.01); *G06F 2221/2153* (2013.01)

(58) Field of Classification Search
CPC ...... G06F 21/78; G06F 21/62; G06F 12/1408; G06F 21/6209; G06F 3/048; G06F 21/6227; G06F 21/60; G06F 12/14; H04N 21/631; H04N 7/1675; H04N 21/23476; H04N 1/04; H04N 1/00132; H04N 1/00159; H04N 1/00193; H04N 1/00355; H04N 1/00363; H04N 1/00366; H04N 1/2038; H04N 1/10; H04N 1/34; H04N 2201/0422; H04L 63/0428; H04L 9/3226
USPC .... 726/30; 713/189, 193; 380/200; 707/640, 707/690; 705/2, 3; 358/474
See application file for complete search history.

(56) References Cited

U.S. PATENT DOCUMENTS

| | | | |
|---|---|---|---|
| 7,376,824 B2 | 5/2008 | Bowers | |
| 2003/0231767 A1* | 12/2003 | Carbajal | 380/200 |
| 2004/0193904 A1* | 9/2004 | Asoh | 713/193 |
| 2008/0068674 A1* | 3/2008 | McIntyre | H04N 1/00132 358/474 |
| 2010/0241977 A1* | 9/2010 | Greetham | 715/764 |

FOREIGN PATENT DOCUMENTS

CN    103198263 A    7/2013

* cited by examiner

*Primary Examiner* — Thanhnga B Truong
(74) *Attorney, Agent, or Firm* — Winston Hsu; Scott Margo

(57) ABSTRACT

A method for managing an external portable storage device includes at least the following steps: when the external portable storage device having at least a non-encrypted partition is electrically connected to an electronic device, searching the external portable storage device for a default image file which is an encrypted partition; and when the default image file is found in the external portable storage device, mounting the default image file to an operating system of the electronic device, such that the encrypted partition and the non-encrypted partition are both available to the operating system for data access.

16 Claims, 5 Drawing Sheets

| DB | |
|---|---|
| REC1 | (user1, sd456, dev123_usr1_1.img, R1,S1) |
| REC2 | (user1, sd456, dev123_usr1_2.img, R2,S2) |
| REC3 | (user2, sd456, dev123_usr2_1.img, R3,S1) |
| ⋮ | ⋮ |

METHOD FOR MANAGING EXTERNAL PORTABLE STORAGE DEVICE AND RELATED MACHINE READABLE MEDIUM

CROSS REFERENCE TO RELATED APPLICATIONS

This application claims the benefit of U.S. provisional application No. 61/811,120, filed on Apr. 12, 2013 and incorporated herein by reference.

BACKGROUND

The disclosed embodiments of the present invention relate to data management, and more particularly, to a method for managing an external portable storage device (e.g., a memory card) and a related machine readable medium.

An external portable storage device such as a secure digital (SD) memory card may be used by an electronic device for data storage. For example, the user may use an SD memory card on a tablet for storing application data and user data. If an operating system (e.g., Android) of the tablet supports a "multi-user" feature, an electronic device therefore can be used by more than one user, where users of the same electronic device are independent of each other. For one example, two users may use the same application that stores some of its data on the same SD memory card. For another example, one user may move an SD memory card from one electronic device to another electronic device having a different multi-user configuration.

However, adding the complexity of multiple users to something as portable as an SD memory card would undoubtedly create some problems. In a conventional design, each user is required to have his/her own private space with encryption on an SD memory card. But this behavior conflicts with the SD memory card's advantage—portability. That is, when any data in an SD memory card of a tablet platform is encrypted to meet the privacy requirements, the SD memory card's portability will lose due to the fact that encrypted data of the SD memory card cannot be easily shared on different tablet platforms and shared between different users. Besides, encryption will cause low access performance of the SD memory card.

Thus, there is a need for an innovative method for managing data stored in an external portable storage device (e.g., a memory card) to balance many factors such as privacy, portability and performance.

SUMMARY

In accordance with exemplary embodiments of the present invention, a method for managing an external portable storage device (e.g., a memory card) and a related machine readable medium are proposed to solve the above-mentioned problem.

According to a first aspect of the present invention, an exemplary method for managing an external portable storage device is disclosed. The exemplary method includes at least the following steps: when the external portable storage device having at least a non-encrypted partition is electrically connected to an electronic device, searching the external portable storage device for a default image file which is an encrypted partition; and when the default image file is found in the external portable storage device, mounting the default image file to an operating system of the electronic device, such that the encrypted partition and the non-encrypted partition are both available to the operating system for data access.

According to a second aspect of the present invention, an exemplary non-transitory machine readable medium storing a program code is disclosed. When executed by a processor, the program code instructs the processor to perform a method for managing an external portable storage device. The method includes following steps: when the external portable storage device having at least a non-encrypted partition is electrically connected to an electronic device, searching the external portable storage device for a default image file which is an encrypted partition; and when the default image file is found in the external portable storage device, mounting the default image file to an operating system of the electronic device, such that the encrypted partition and the non-encrypted partition are both available to the operating system for data access.

According to a third aspect of the present invention, an exemplary method for managing an external portable storage device is disclosed. The exemplary method includes following steps: when the external portable storage device having an export image file and an encrypted secret key is electrically connected to an electronic device, receiving a password from a user input, wherein the export image file is an encrypted partition created by another electronic device based on a secret key, and the encrypted secret key is generated from encrypting the secret key by the another electronic device based on the password; and utilizing the password to decrypt the encrypted secret key for obtaining the secret key, and mounting the export image file to an operating system of the electronic device according to the secret key.

According to a fourth aspect of the present invention, an exemplary non-transitory machine readable medium storing a program code is disclosed. When executed by a processor, the program code instructs the processor to perform a method for managing an external portable storage device. The method includes following steps: when the external portable storage device having an export image file and an encrypted secret key is electrically connected to an electronic device, receiving a password from a user input, wherein the export image file is an encrypted partition created by another electronic device based on a secret key, and the encrypted secret key is generated from encrypting the secret key by the another electronic device based on the password; and utilizing the password to decrypt the encrypted secret key for obtaining the secret key, and mounting the export image file to an operating system of the electronic device according to the secret key.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to configure an external portable storage device (e.g., a memory card) to have one public partition shared to all users and one private partition for each user. Besides, each private partition is an encrypted partition generated from encryption based on a secret key such that the user privacy is secured by the secret key owned by the user only. In one exemplary design, the secret key may be randomly generated by an electronic device (e.g., a mobile device). It should be noted that, only the private partition is protected by encryption, while the public partition is a non-encrypted partition. Since the user doesn't have too much private data to be stored on the external portable storage device, the size of each private partition is small compared to the public partition. Hence, the access performance of the external portable storage device would not be significantly degraded by encryption of the small-sized private partition. In this way, the proposed management scheme is capable of achieving the balance among privacy, portability and performance of the external portable storage device. Further description of the proposed management scheme applied to the external portable storage device is detailed as below.

Figure 1:
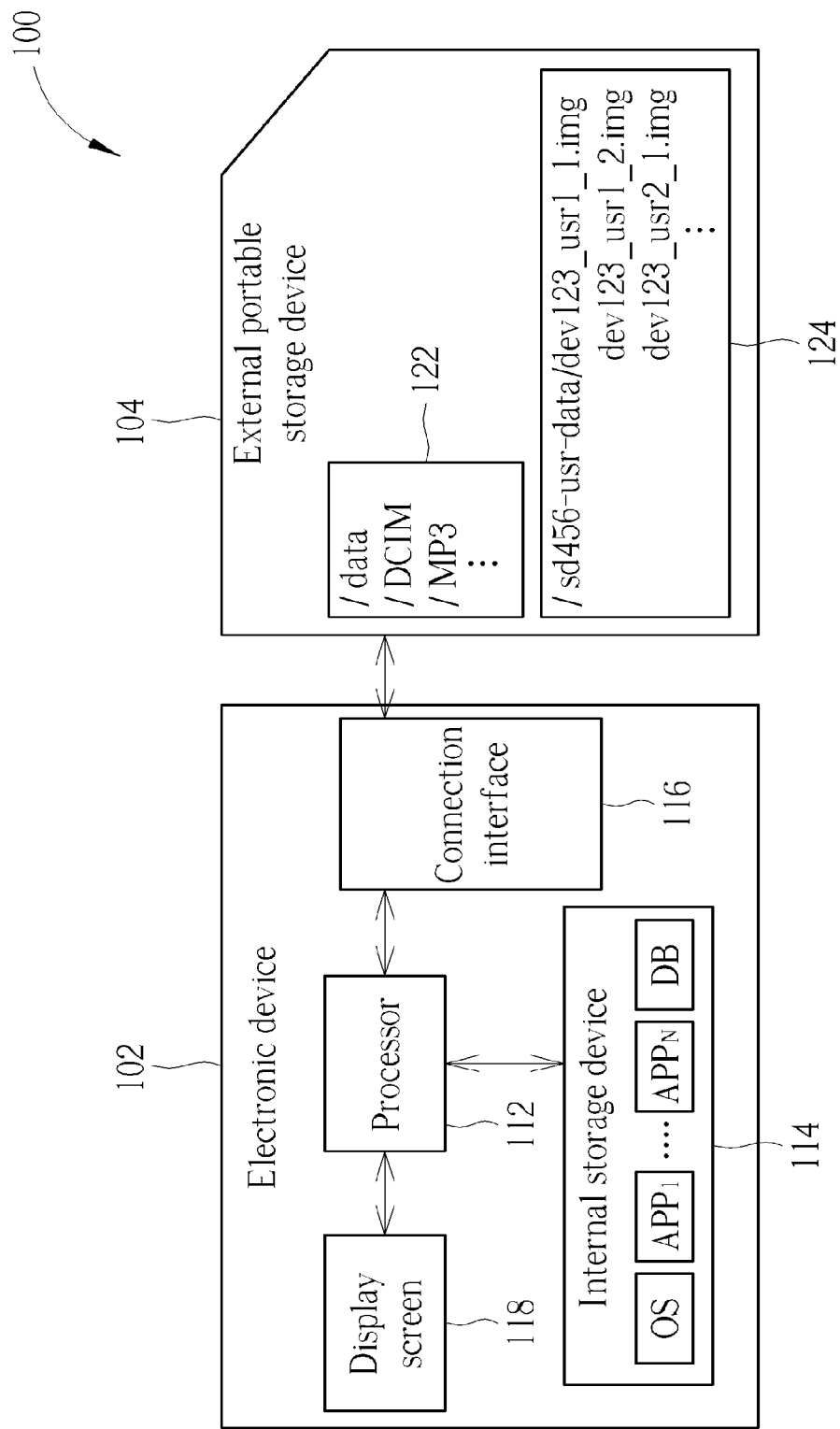
FIG. 1 is a block diagram illustrating an electronic system according to a first embodiment of the present invention.

FIG. 1 is a block diagram illustrating an electronic system according to a first embodiment of the present invention. The electronic system 100 includes an electronic device (e.g., a tablet) 102 and an external portable storage device (e.g., an SD memory card) 104. By way of example, but not limitation, the electronic device 102 includes a processor 112, an internal storage device (e.g., an embedded Multi Media Card (eMMC)) 114, a connection interface (e.g., a card reader) 116, and a display screen (e.g., a touch screen) 118; and the external portable storage device 104 is formatted to include at least a first data partition 122 and a second data partition 124, where the first data partition 122 is a non-encrypted partition used to serve as a public partition available to all users, and the second data partition 124 is used to store image files each being an encrypted partition available to one authorized user only. Hence, different users may store public data (e.g., audio data, image data, non-private user data, etc.) in the large-sized non-encrypted partition of the external portable storage device 104, and the private data (e.g., private user data, private application data, etc.) is protected in the small-sized encrypted partition for each user.

Suppose that the electronic device has a device name "dev123" and the external portable storage device 104 has a device name "sd456". When an operating system OS of the electronic device 102 supports a multi-user feature, the second data partition 124 may have one image file with a file name "dev123_usr1_1.img" for the first user, another image file with a file name "dev123_usr1_2.img" for the first user, and one image file with a file name "dev123_usr2_1.img" for the second user. More specifically, a file name "devXX_usrY_Z.img" means a $Z^{th}$ image file created for a user Y on the external portable storage device XX (in this embodiment, XX=123). When the user Y wants to read his/her private contents from the image file "devXX_usrY_1.img", the user Y has to log in the electronic device 102 first. After a user account of the user Y is successfully logged in on the electronic device 102, the user Y may access his/her private contents on the electronic device 102 directly or on a personal computer (PC) which is connected to the electronic device 102 via an MTP (Media Transfer Protocol) or UMS (USB Mass Storage) mode.

The internal storage device 114 is used to store a plurality of program codes, including the operating system OS (e.g., an Android system) and many applications $APP_1$-$APP_N$. In a preferred embodiment, the proposed management scheme may be realized by a software-based manner. Hence, a method for managing an external portable storage device is implemented using a program code, where the program code may be one of the applications $APP_1$-$APP_N$ or embedded in the operating system OS. When executed by the processor 112, the program code instructs the processor 112 to perform the proposed method for managing the external portable storage device 104 electrically connected to the electronic device 102.

Figures 2, 3:
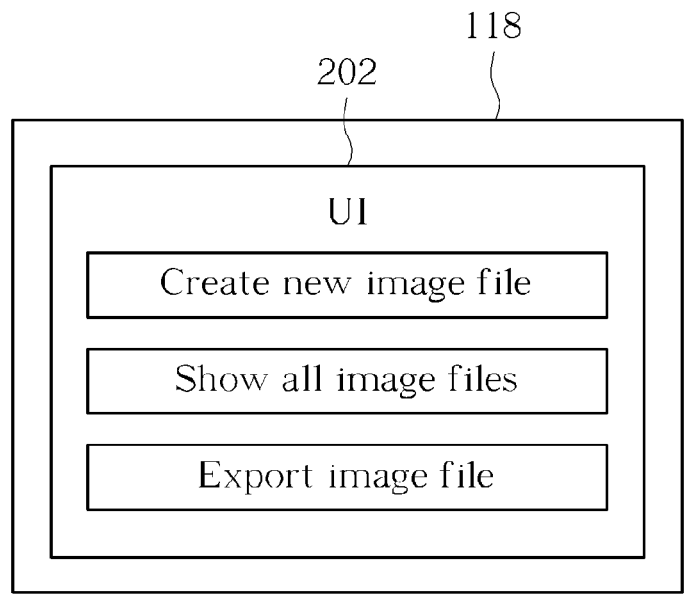
FIG. 2 is a diagram illustrating new setting options for managing an external portable storage device according to an embodiment of the present invention.
FIG. 3 is a diagram illustrating image file records stored in an image file database of an electronic device according to an embodiment of the present invention.

FIG. 2 is a diagram illustrating setting options for managing an external portable storage device according to an embodiment of the present invention. When a program code stored in a machine readable medium (e.g., one of the applications $APP_1$-$APP_N$ or part of the operating system OS in the internal storage device 114) is executed by the processor 112, the processor 112 may control the display screen 118 to show a user interface (UI) 202, where the UI 202 may display three setting options "Create new image file", "Show all image files" and "Export image file" for an authorized user having a user account currently logged in on the electronic device 102. When the authorized user (e.g., user Y) selects the setting option "Create new image file", the proposed management method creates a new image file with a file name "devXX_usrY_Z.img" in the second data partition 124 of the external portable storage device 104 for the user Y, where a secret key Rx is a randomly generated bitstream used for encrypting a raw image file into the new image file "devXX_usrY_Z.img". Besides, the proposed management method adds an image file record to an image file database DB in a secure place of the internal storage device 114.

FIG. 3 is a diagram illustrating image file records stored in an image file database of an electronic device according to an embodiment of the present invention. For example, when the first user logs in a corresponding user account user1 of the electronic device 102 and operates the electronic device 102 to create a new image file with a file name "dev123_usr1_1.img", an image file record REC1 is added to the image file database DB, where the image file record REC1 records the account name of the user account "user1", the device name of the external portable storage device "sd456", the file name of the currently created image file "dev123_usr1_1.img", the secret key used for encryption R1, and a default image file indicator S1. The default image file indicator is used to indicate whether the associated image file dev123_usr1_1.img is a default image file that should be automatically mounted when the external portable storage device 104 is electrically connected to the electronic device 102 with the user account user1 logged in. In this embodiment, when a default image file indicator is set by S1 (e.g., '1'), an associated image file is set as a default image file (i.e., a designated image file which is required to be used by a user each time an external portable storage device is electrically connected to an electronic device with an associated user account logged in); and when a default image file indicator is set by S2 (e.g., '0'), an associated image file is set as a non-default image file (i.e., an image file just stored in an external portable storage device).

It is possible that the same user may create more than one new image file in the same external portable storage device 104. For example, the authorized user (e.g., first user) may further operate the electronic device 102 to create another new image file with a file name "dev123_usr1_2.img", an image file record REC2 is added to the image file database DB, where the image file record REC2 records the account name of the user account "user1", the device name of the external portable storage device "sd456", the file name of the currently created image file "dev123_usr1_2.img", the secret key used for encryption R2, and a default image file indicator S2. Since the default image file indicator is set by S2, the image file dev123_usr1_2.img would not be automatically mounted when the external portable storage device 104 is electrically connected to the electronic device 102 with the user account user1 logged in.

Since the operating system OS of the electronic device 102 supports a multi-user feature, a different user (e.g., second user) may login the electronic device 102 to activate a corresponding user account user2. Hence, when the second user activates the corresponding user account user2 on the electronic device 102 and operates the electronic device 102 to create a new image file with a file name "dev123_usr2_1.img", an image file record REC3 is added to the image file database DB, where the image file record REC3 records the account name of the user account "user2", the device name of the external portable storage device "sd456", the file name of the currently created image file "dev123_usr2_1.img", the secret key used for encryption R3, and a default image file indicator S1. In this example, since the default image file indicator is set by S1, the image file dev123_usr2_1.img would be automatically mounted when the external portable storage device 104 is electrically connected to the electronic device 102 with the user account user2 logged in.

It should be noted that the number of image file records and the content of each image file record shown in FIG. 3 are for illustrative purposes only. For example, different external portable storage devices may be used on the same electronic device by different users. Thus, the image file database DB of the electronic device 102 will be updated if needed. For example, when a different authorized user (e.g., third user) activates a corresponding user account user3 on the electronic device 102 and operates the electronic device 102 to create a new image file with a file name "dev123_usr3_1.img" on a different electronic device with a device name "sd789", a new image file record (user3, sd789, dev123_usr3_1.img, R4, S1) is added to the image file database DB.

In one exemplary design, the secret key used for encryption is part of the image file record stored in the image file database DB. That is, the secret key is directly stored in the image file database DB. Thus, each of R1, R2 and R3 shown in FIG. 3 may be one secret key directly. However, this is for illustrative purposes only, and is not meant to be a limitation of the present invention. In another exemplary design, the secret key used for encryption may be stored in a place outside the image file database DB, and a pointer is part of the image file record stored in the image file database DB, where the pointer indicates the storage address of the secret key used for encryption. In other words, each of R1, R2 and R3 shown in FIG. 3 may be an address indicator of a secret key rather than the secret key itself.

Figure 4:
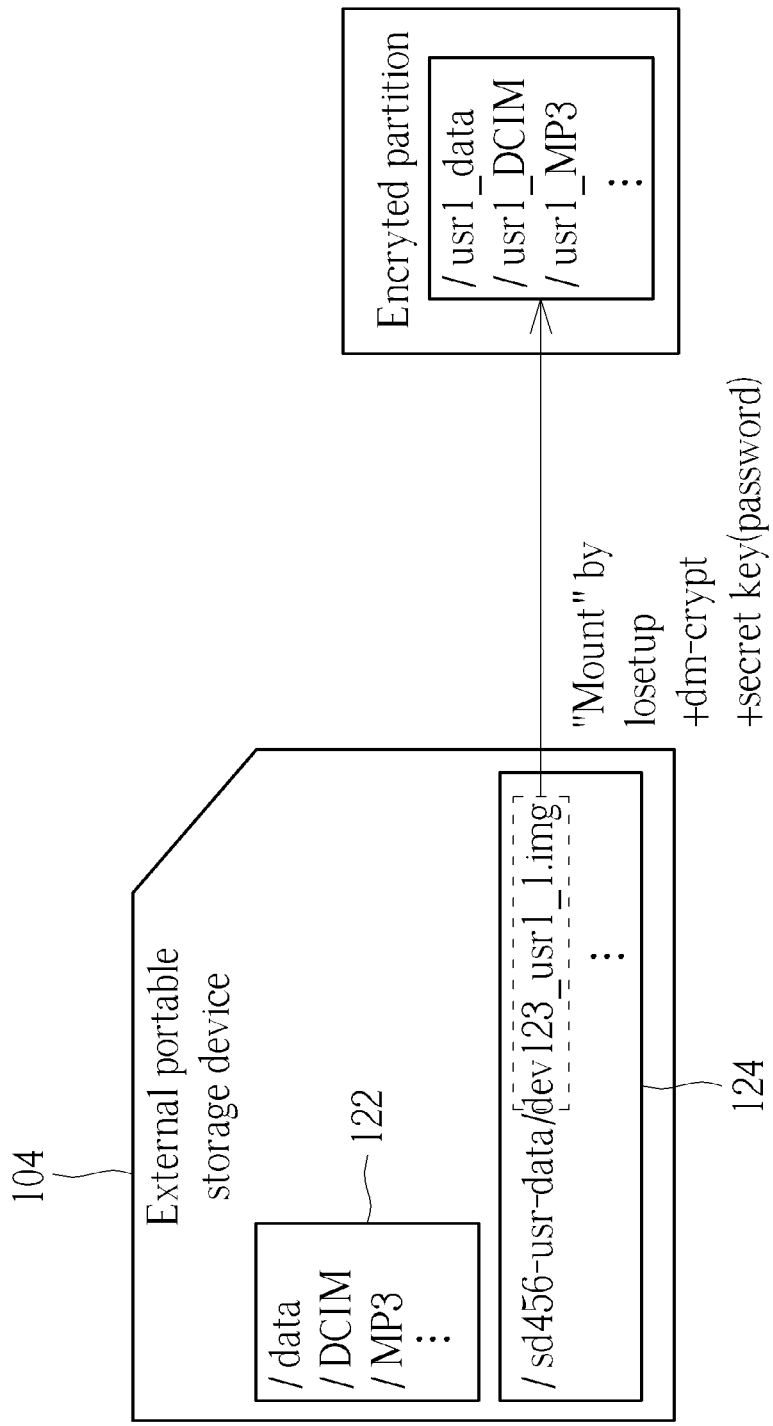
FIG. 4 is a diagram illustrating an example of mounting an image file in an external portable storage device to an operating system of an electronic device.

When the authorized user selects the setting option "Show all image files", the proposed management method scans the image file database DB to find any image file record having the account name identical to that of the user account currently logged in and having the device name identical to that of the external portable storage device 104 electrically connected to the electronic device 102. Besides, the proposed management method may mount an image file indicated by one of the found image file records if necessary. For example, when the first user logs in the electronic device 102 to activate the corresponding user account user1 and then selects the setting option "Show all image files", the image file records REC1 and REC2 are found after scanning the image file database DB shown in FIG. 3. As the image file record REC1 indicates that the image file dev123_usr1_1.img is a default image file, the image file dev123_usr1_1.img will be automatically mounted to the operating system OS of the electronic device 102. More specifically, based on the information given in the image file record REC1 that is found based on at least the user account usr1 currently logged in on the electronic device 102, the file name of the default image file "dev123_usr1_1.img" is known, and the secret key R1 used for creating the default image file dev123_usr1_1.img can be retrieved. In other words, the proposed management method refers to a user account currently logged in on the electronic device 102 to search the connected external portable storage device 104 for the default image file associated with the user account, and retrieve a secret key stored in the electronic device 102 for the default image file. Next, when the default image file is found in the external portable storage device 104, the proposed management method mounts the default image file dev123_usr1_1.img to the operating system OS according to the secret key "R1". Consider a case where the operating system OS is an Android system or a Linux-based system, we can use "cryptsetup" and "device-mapper" which are already supported by the Android system to mount an image file to an Android platform. An example is given as below for illustrative purposes.

dd if=/dev/zero of=./vol_aes256 bs=1k count=1024
    losetup -e AES256 /dev/loop0 ./vol_aes256
    # Enter password: password1234567890ABC
    mkdosfs /dev/loop0
    mkdir ./test_mountpoint
    mount /dev/loop0 ./test_mountpoint
    echo "This is a text test file" >./test_mountpoint/SHORT_TEXT.txt
    umount /dev/loop0
    losetup -d /dev/loop0
    rm -rf ./test_mountpoint Please refer to FIG. 4, which is a diagram illustrating an example of mounting an image file in an external portable storage device to an operating system of an electronic device. After the encrypted partition is mounted successfully, the non-encrypted partition and the encrypted partition are available to the operating system OS for data access. More specifically, in a case where the external portable storage device 104 is an SD memory card, the operating system OS of the electronic device 102 sees two virtual external SD memory cards for one physical external SD card memory 104 connected to the electronic device (e.g., a tablet) 102. The directories /data, /DCIM and /MP3 are visible to all users, whereas the directories /usr1_data, /usr1_DCIM and /usr1_MP3 are visible to the first user only. Moreover, when the electronic device (e.g., a tablet) 102 is connected to a PC to act as an MTP device, the PC therefore regards the internal storage device 114 as external device (e.g., /mnt/sdcard, internal eMMC), regards the non-encrypted partition (i.e., the first data partition 122) as external device 2 (e.g., /mnt/sdcard2, virtual external SD card 1), and regards the encrypted partition as external device 3 (e.g., /mnt/sdcard3, virtual external SD card 2), where shown contents in the external device 1 may be regarded as user-dependent, shown contents in the external device 2 may be regarded as user-independent, and shown contents in the external device 3 may be regarded as user-dependent.

The setting option "Show all image files" mentioned above also allows an authorized user to mount any of image files, each having an image file record in the image file database DB, to the operating system OS of the electronic device 102. For example, when the authorized user (e.g., first user) selects the setting option "Show all image files", the proposed management method scans the image file database DB to find all image file records, each having the account name identical to that of the user account usr1 currently logged in and also having the device name identical to that of the external portable storage device 104 electrically connected to the electronic device 102; and then refers to the found image file records (e.g., REC1 and REC2) to display file names of the image files (e.g., "dev123_usr1_1.img" and "dev123_usr1_2.img") on the display screen 118. The authorized user (e.g., first user) can change/set the default image file setting manually. For example, when the authorized user (e.g., first user) selects the image file dev123_usr1_2.img as the default image file, the image file record REC1 is modified to be (user1, sd456, dev123_usr1_1.img, R1, S2), and the image file record REC2 is modified to be (user1, sd456, dev123_usr1_2.img, R1, S1). In this way, the image file "dev123_usr1_2.img" will be mounted due to the associated default image file indicator updated to S1.

As shown in FIG. 2, there is a setting option "Export image file" presented in the UI 202. The setting option "Export image file" allows a current user (i.e., a user with a user account currently logged in on an electronic device) to share an image file (i.e., an encrypted partition with private data) created on one electronic device to another electronic device. For example, when the first user selects the setting option "Export image file", the proposed management method scans the image file database DB to find an image file record of a currently mounted default image file associated with an account user1 logged in. For example, as the image file record REC1 shown in FIG. 3 has the default image file indicator set by S1, the proposed management method refers to the image file record REC1 to know that the currently mounted default image file dev123_usr1_1.img is generated by encryption based on the secret key R1. Hence, the proposed management method encrypts the secret key R1 into an encrypted secret key R1* according to a password. It is noted that the password may be a one-time password, thus the user can use a different password to encrypt the same secret key each time. In this way, the user doesn't need to remember the password painstakingly.

In one exemplary design, the proposed management method may control the display screen 118 to show a message for instructing the current user to input the password dedicated to encrypting the secret key R1. In another exemplary design, the proposed management method may directly use the login password of current user's user account as the password to encrypt the secret key R1. After the file name of the currently mounted image file dev123_usr1_1.img and the encrypted secret key R1* are obtained, the proposed management method adds an export image record (dev123_usr1_1.img, R1*), including the file name of the export image file and the encrypted secret key, to the external portable storage device 104. A user (e.g., first user) can move the external portable storage device 104 to another electronic device for importing the selected image file created for the electronic device 102 (e.g., the default image file dev123_usr1_1.img) to another electronic device.

Figure 5:
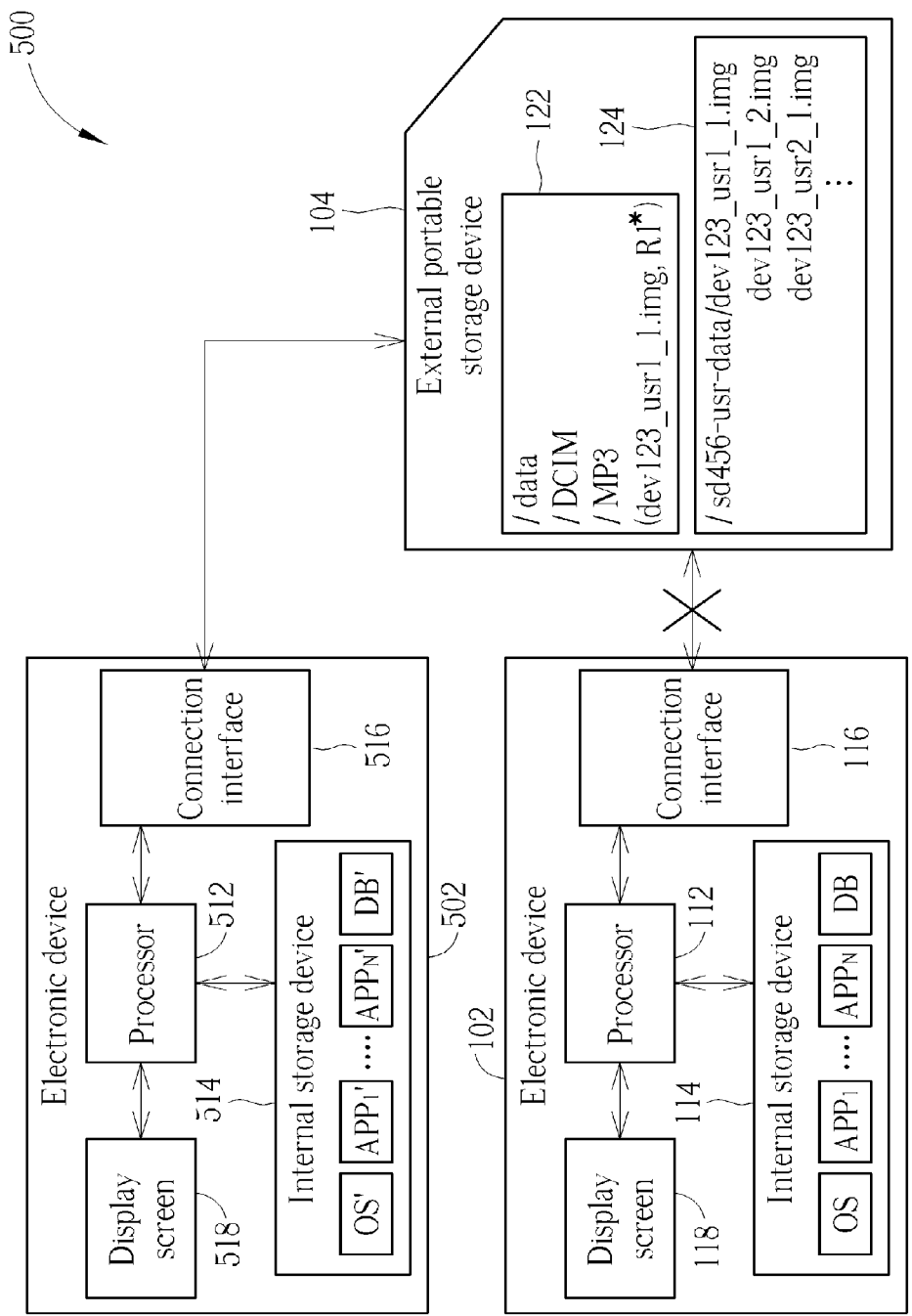
FIG. 5 is a block diagram illustrating an electronic system according to a second embodiment of the present invention.

FIG. 5 is a block diagram illustrating an electronic system according to a second embodiment of the present invention. The electronic system 500 includes an electronic device (e.g., a tablet) 502 and the aforementioned electronic device 102 and external portable storage device 104, wherein the electronic system can be used in a mobile device, such as a Mobile Phone or a Tablet. Each of the electronic devices 102 and 502 supports the proposed management method. By way of example, the structure of the electronic device 502 is identical to that of the electronic device 102, and therefore includes a processor 512, an internal storage device (e.g., an embedded Multi Media Card (eMMC)) 514, a connection interface (e.g., a card reader) 516, and a display screen (e.g., a touch screen) 518. Similarly, when a user Y wants to read his/her private contents from an image file "devXX_usrY_Z.img", the user Y has to log in the electronic device 502 first. After a user account of the user Y is successfully logged in on the electronic device 502, the user Y may access his/her private contents on the electronic device 502 directly or on a PC which is connected to the electronic device 502 via an MTP or UMS mode.

Like the internal storage device 114 of the electronic device 102, the internal storage device 514 of the electronic device 502 stores a plurality of program codes, including an operating system OS' (e.g., an Android system) and many applications $APP_1'$-$APP_N'$, and also stores an image file database DB' which stores information of image files (encrypted partitions) created by or imported to the electronic device 502. The proposed management method mentioned above is also employed by the electronic device 502, and is implemented using a program code which may be one of the applications $APP_1'$-$APP_N'$ or embedded in the operating system OS'. Besides creating new image files, the proposed management method allows an export image file from another electronic device (e.g., 102) to be imported to an electronic device (e.g., 502). Therefore, when a user account is logged in on an electronic device (e.g., 502), a default image file associated with the user account may be an export image file created from another electronic device (e.g., 102) or an image file originally created by the electronic device (e.g., 502). Further details directed to managing an export image file are described as below.

Figure 6:
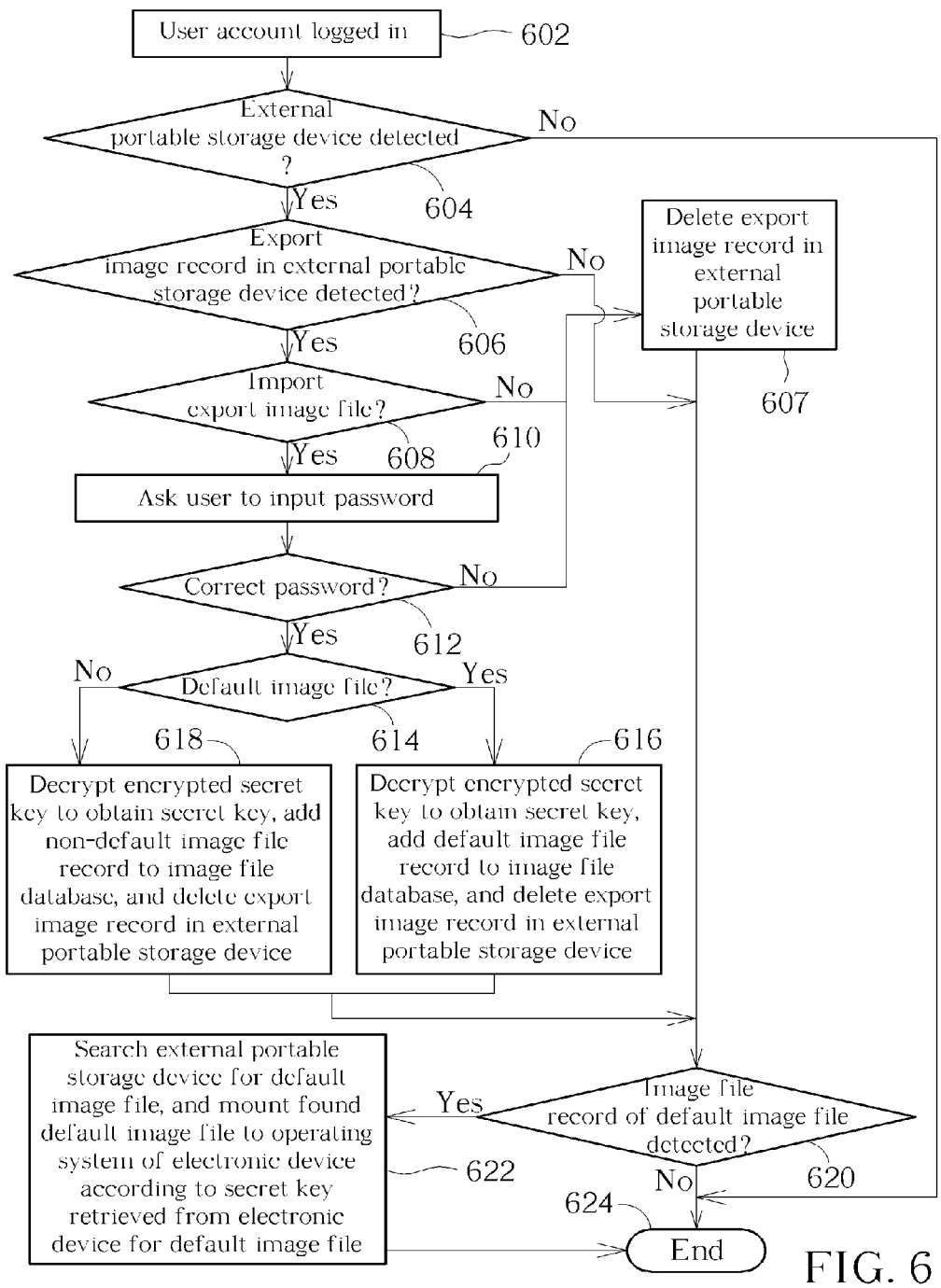
FIG. 6 is a flowchart illustrating a method of managing an external portable storage device according to an embodiment of the present invention.

Please refer to FIG. 6, which is a flowchart illustrating a method of managing an external portable storage device according to an embodiment of the present invention. Provided that the result is substantially the same, the steps are not required to be executed in the exact order shown in FIG. 6. The method may be briefly summarized as below.

Step 602: A user account is logged in on an electronic device.

Step 604: Check if an external portable storage device is electrically connected to the electronic device. If yes, go to step 606; otherwise, go to step 624.

Step 606: Check if there is an export image record in the external portable storage device. If yes, go to step 608; otherwise, go to step 620.

Step 607: Delete the export image record in the external portable storage device. Go to step 620.

Step 608: Check if the user wants to import the export image file to the electronic device. If yes, go to step 610; otherwise, go to step 607.

Step 610: Ask the user to input a password for decrypting an encrypted secret key indicated by the export image record.

Step 612: Check if the password is correct. If yes, go to step 614; otherwise, go to step 607.

Step 614: Check if the user wants to set the export image file as a default image file. If yes, go to step 616; otherwise, go to step 618.

Step 616: Decrypt the encrypted secret key to obtain a secret key, add a default image file record to an image file database, and delete the export image record in the external portable storage device. Go to step 620.

Step 618: Decrypt the encrypted secret key to obtain a secret key, add a non-default image file record to an image file database, and delete the export image record in the external portable storage device. Go to step 620.

Step 620: Check if the image file database of the electronic device has a default image file associated with the external portable storage device and a user account currently logged in on the electronic device. If yes, go to step 622; otherwise, go to step 624.

Step 622: Search the external portable storage device for a default image file, and mount the found default image file to an operating system of the electronic device according to a secret key retrieved from the electronic device for the default image file.

Step 624: End a procedure of managing the external portable storage device.

After a user (i.e., first user) performs a login procedure on the electronic device 502 to have a user account (i.e., usr1) logged in on the electronic device 502, the proposed management method (which is executed by the processor 512 running a program code) checks if an external portable storage device is electrically connected to the electronic device 502 (steps 602, 604). In a case where there is no external portable storage device electrically connected to the electronic device 502, the procedure of mounting an image file (encrypted partition) in an external portable storage device is ended (step 624). In another case where the external portable storage device 104 is electrically connected to the electric device 502, the proposed management method checks if the external portable storage device 104 has an export image record (step 606). If it is determined that there is no export image record available in the external portable storage device 104 electrically connected to the electronic device 502, the procedure of importing an export image file to the electronic device 502 is ended, and the flow proceeds to a procedure of mounting a default image file (step 620). In this embodiment, the export image record (dev123_usr1_1.img, R1*) is stored in the external portable storage device 104. Hence, the proposed management method controls the display screen 518 to show a message to ask the user to confirm whether the export image file indicated by the export image record should be imported (step 608). It is possible that the export image file in the external portable storage device 104 is not created by the current user of the electronic device 502. Step 608 therefore allows the current user to manually determine whether to continue the procedure of importing the export image file. If the current user of the electronic device 502 decides not to import the export image file, the export image record in the external portable storage device 104 will be deleted (step 607), and the flow proceeds to a procedure of mounting a default image file (step 620). In this way, when the same user logs in the electronic device 502 again under the condition that the external portable storage device 104 is electrically connected to the electronic device 502, the procedure of importing an export image file is skipped without bothering the user.

In this embodiment, since the export image record (dev123_usr1_1.img, R1*) is created by the first user on another electronica device 102, the current user (i.e., the first user) on the electronic device 502 can generate a user input to indicate that he/she wants to import the export image file to the electronic device 502. Next, the proposed management method controls the display screen 518 to show a message to ask the user to input a password required for decrypting the encrypted secret key R1* (Step 610). When a correct password is not received, the procedure of importing the export image file to the electronic device 502 is ended, and the flow proceeds to the procedure of mounting a default image file (Step 620). When the correct password is received, this means a correct secret key required for decrypting the encrypted export image file dev123_usr1_1.img can be obtained. As mentioned above, an image file may be a default image file (which will be automatically mounted when an associated user account is currently logged in on an electronic device) or a non-default image file (which will not be automatically mounted when an associated user account is currently logged in on an electronic device).

Step 614 is executed to allow the user to manually decide whether to set the export image file as a default image file. When a user input indicates that the export image file should be set as a default image file, the proposed management method decrypts the encrypted secret key R1* to obtain a secret key R1, adds a default image file record (user1, sd456, dev123_usr1_1.img, R1, S1) to the image file database DB' of the electronic device 502, and deletes the export image record (dev123_usr1.img, R1*) in the external portable storage device 104 (step 616), thus accomplishing the procedure of importing an export image file. When a user input indicates that the export image file should not be set as a default image file, the proposed management method decrypts the encrypted secret key R1* to obtain a secret key R1, adds a non-default image file record (user1, sd456, dev123_usr1_1.img, R1, S2) to the image file database DB' of the electronic device 502, and deletes the export image record (dev123_usr1.img, R1*) in the external portable storage device 104 (step 618), thus accomplishing the procedure of importing an export image file. It should be noted that the export image record (dev123_usr1.img, R1*) is removed from the external portable storage device 104 in each of steps 616, 618 to prevent the procedure of importing the image file dev123_usr1.img from being executed again when the same user logs in the electronic device 502 again under the condition that the external portable storage device 104 is electrically connected to the electronic device 502.

After the default/non-default image file record is added to the image file database DB', the procedure of mounting a default image file associated with an user account currently logged in on an electronic device is performed (steps 620, 622). As a person skilled in the art can readily understand details of steps 620 and 622 after reading above paragraphs directed to the electronic system 100 shown in FIG. 1, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing an external portable storage device, comprising:
   when the external portable storage device is electrically connected to an electronic device, searching the external portable storage device for a default image file which is an encrypted partition;
   when the default image file is found in the external portable storage device, mounting the default image file to an operating system of the electronic device, such that the encrypted partition is available to the operating system for data access, wherein when the default image file is not found in the external portable storage device, no default image file is mounted from the external portable storage device to the operating system of the electronic device that is electrically connected to the external portable storage device; and
   when the external portable storage device is electrically connected to the electronic device, checking if there is an export image record available in the external portable storage device;
   wherein the export image record is arranged to indicate a file name of an export image file in the external portable storage device and an encrypted secret key in the external portable storage device, the export image file is an encrypted partition created by another electronic device based on a secret key, and the encrypted secret key is generated from encrypting the secret key by the another electronic device.

2. The method of claim 1, further comprising:
   when it is determined that the export image record is available in the external portable storage device, importing the export image file to the electronic device.

3. The method of claim 2, wherein the encrypted secret key is generated from encrypting the secret key based on a password, and the step of importing the export image file to the electronic device comprises:
   receiving the password from a user input; and
   utilizing the password to decrypt the encrypted secret key for storing the secret key into the electronic device, and setting the export image file as the default image file.

4. The method of claim 3, wherein the password is a one-time password.

5. The method of claim 3, wherein the step of importing the export image file to the electronic device further comprises:
   deleting the export image record in the external portable storage device.

6. The method of claim 2, wherein the encrypted secret key is generated from encrypting the secret key based on a password, and the step of importing the export image file to the electronic device comprises:
   receiving the password from a user input; and
   utilizing the password to decrypt the encrypted secret key for storing the secret key into the electronic device, and setting the export image file as a non-default image file.

7. The method of claim 6, wherein the step of importing the export image file to the electronic device further comprises:
   deleting the export image record in the external portable storage device.

8. The method of claim 1, further comprising:
   when it is determined that the export image record is available in the external portable storage device and the export image file is not imported to the electronic device, deleting the export image record in the external portable storage device.

9. A non-transitory machine readable medium storing a program code, wherein when executed by a processor, the program code instructs the processor to perform a method for managing an external portable storage device, and the method includes following steps:
   when the external portable storage device is electrically connected to an electronic device, searching the external portable storage device for a default image file which is an encrypted partition;
   when the default image file is found in the external portable storage device, mounting the default image file to an operating system of the electronic device, such that the encrypted partition is available to the operating system for data access, wherein when the default image file is not found in the external portable storage device, no default image file is mounted from the external portable storage device to the operating system of the electronic device that is electrically connected to the external portable storage device; and
   when the external portable storage device is electrically connected to the electronic device, checking if there is an export image record available in the external portable storage device;
   wherein the export image record is arranged to indicate a file name of an export image file in the external portable storage device and an encrypted secret key in the external portable storage device, the export image file is an encrypted partition created by another electronic device based on a secret key, and the encrypted secret key is generated from encrypting the secret key by the another electronic device.

10. The non-transitory machine readable medium of claim 9, wherein the method performed by the processor further comprises:
    when it is determined that the export image record is available in the external portable storage device, importing the export image file to the electronic device.

11. The non-transitory machine readable medium of claim 10, wherein the encrypted secret key is generated from encrypting the secret key based on a password, and the step of importing the export image file to the electronic device comprises:
    receiving the password from a user input; and
    utilizing the password to decrypt the encrypted secret key for storing the secret key into the electronic device, and setting the export image file as the default image file.

12. The non-transitory machine readable medium of claim 11, wherein the password is a one-time password.

13. The non-transitory machine readable medium of claim 11, wherein the step of importing the export image file to the electronic device further comprises:
    deleting the export image record in the external portable storage device.

14. The non-transitory machine readable medium of claim 10, wherein the encrypted secret key is generated from encrypting the secret key based on a password, and the step of importing the export image file to the electronic device comprises:
   receiving the password from a user input; and
   utilizing the password to decrypt the encrypted secret key for storing the secret key into the electronic device, and setting the export image file as a non-default image file.

15. The non-transitory machine readable medium of claim 14, wherein the step of importing the export image file to the electronic device further comprises:
   deleting the export image record in the external portable storage device.

16. The non-transitory machine readable medium of claim 9, wherein the method performed by the processor further comprises:
   when it is determined that the export image record is available in the external portable storage device and the export image file is not imported to the electronic device, deleting the export image record in the external portable storage device.

* * * * *